US008459717B2

(12) United States Patent
Cain et al.

(10) Patent No.: US 8,459,717 B2
(45) Date of Patent: Jun. 11, 2013

(54) HINGE ASSEMBLIES FOR DOOR LIDS AND METHODS OF THEIR DELIVERY

(75) Inventors: Charles Laverle Cain, Verona, KY (US); Patrick F. Showalter, Louisville, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 236 days.

(21) Appl. No.: 13/024,405

(22) Filed: Feb. 10, 2011

(65) Prior Publication Data

US 2012/0204491 A1 Aug. 16, 2012

(51) Int. Cl.
*B62D 25/12* (2006.01)

(52) U.S. Cl.
USPC .................................. 296/76; 16/255; 16/301

(58) Field of Classification Search
USPC ................ 296/56, 146.8, 146.11, 76; 16/255, 16/301; 49/386
See application file for complete search history.

(56) References Cited

U.S. PATENT DOCUMENTS

| | | | | |
|---|---|---|---|---|
| 2,894,277 | A | 7/1959 | Bogater et al. | |
| 3,476,375 | A | 11/1969 | Brasseur | |
| 4,776,626 | A * | 10/1988 | Seyler | 296/76 |
| 5,074,609 | A | 12/1991 | Dear | |
| 5,243,738 | A | 9/1993 | Kiefer | |
| 5,500,985 | A * | 3/1996 | Klueger | 16/354 |
| 5,584,099 | A | 12/1996 | Westerdale | |
| 5,873,619 | A | 2/1999 | Lewkoski et al. | |
| 5,967,586 | A | 10/1999 | Duffy et al. | |
| 6,382,704 | B1 | 5/2002 | Natasoiu | |
| 7,314,243 | B2 | 1/2008 | Okada et al. | |
| 7,350,845 | B1 | 4/2008 | Duffy | |
| 7,469,953 | B2 | 12/2008 | Heath et al. | |
| 7,594,301 | B2 | 9/2009 | Krajenke et al. | |
| 2008/0018131 | A1 * | 1/2008 | Heath et al. | 296/76 |
| 2008/0084087 | A1 * | 4/2008 | Duffy | 296/76 |
| 2010/0251519 | A1 | 10/2010 | Duffy | |
| 2010/0275518 | A1 * | 11/2010 | Nakazato | 49/386 |

* cited by examiner

*Primary Examiner* — Jason S Morrow
(74) *Attorney, Agent, or Firm* — Dinsmore & Shohl LLP

(57) ABSTRACT

A hinge assembly for a door lid of a vehicle includes a hinge arm support bracket that mounts within a luggage compartment of the vehicle. A hinge arm is connected to the support bracket at a proximal portion and including a distal portion that is mountable to the door lid, the hinge arm being pivotable relative to the support bracket. A force adjustment member is pivotally connected to the hinge arm. The force adjustment member includes a torsion bar mount portion extending outwardly from the hinge arm having an opening therethrough to receive an end of a torsion bar and a tool receiving portion that engages a torque adjustment tool to pivot the force adjustment member to apply a torque to the torsion bar.

16 Claims, 5 Drawing Sheets

HINGE ASSEMBLIES FOR DOOR LIDS AND METHODS OF THEIR DELIVERY

TECHNICAL FIELD

The present specification generally relates to door lid assemblies and hinge assemblies for assisting in opening and raising door lids.

BACKGROUND

Torsion bars have been used in assisting in the opening and raising doors and lids of vehicles. Typically, the torsion bar has at least two U-shaped portions that are typically formed by bending the bar. When the door is open, one of the U-shaped portions contacts the underside of the door and the other U-shaped portion contacts the structure adjacent the door. When the door is closed, it pushes one of the radially extending portions towards the other, twisting the rod and creating a spring-like tension in the rod.

It is also known to use torsion bars to open trunk lids and hoods in automobiles. However, there may be a number of desirable parameters in designing a door lifting mechanism. For example, it may be desirable to provide a "pop-up" force to raise the trunk lid a short distance from its locked position without any outside assistance. It may also be desirable to provide a "hold open" force which will support the door in a position where it is placed.

In order to provide sufficient force, the use of a pair of torsion bars is known where the torsion bars are mounted to cross each other. However, such an installation is ergonomically difficult as often times the torsion bars are installed manually.

SUMMARY

In one embodiment, a hinge assembly for a door lid of a vehicle includes a hinge arm support bracket that mounts within a luggage compartment of the vehicle. A hinge arm is connected to the support bracket at a proximal portion and including a distal portion that is mountable to the door lid, the hinge arm being pivotable relative to the support bracket. A force adjustment member is pivotally connected to the hinge arm. The force adjustment member includes a torsion bar mount portion extending outwardly from the hinge arm having an opening therethrough to receive an end of a torsion bar and a tool receiving portion that engages a torque adjustment tool to pivot the force adjustment member to apply a torque to the torsion bar.

In another embodiment, a door lid and hinge subassembly for a vehicle includes a door lid that pivotally connects at a luggage compartment of a vehicle. A hinge assembly includes a hinge arm that is mounted to the door lid and a hinge arm support bracket that mounts within a luggage compartment of the vehicle. The hinge arm is pivotable relative to the support bracket. A force adjustment member is pivotally connected to the hinge arm. The force adjustment member includes a torsion bar mount portion extending outwardly from the hinge arm having an opening therethrough to receive an end of a torsion bar and a tool receiving portion that engages a torque adjustment tool to pivot the force adjustment member to apply a torque to the torsion bar.

In another embodiment, a method of applying a torque to a torsion bar of a hinge assembly comprises: connecting a hinge arm to a door lid to be mounted to a vehicle, the hinge arm being pivotally connected to a support bracket that is mountable within a luggage compartment of a vehicle; connecting a first torsion bar to the support bracket; and connecting a second torsion bar to a force adjustment member that is pivotally connected to the hinge arm, the force adjustment member comprising a torsion bar mount portion extending outwardly from the hinge arm having an opening therethrough to receive an end of the second torsion bar and a tool receiving portion that engages a torque adjustment tool to pivot the force adjustment member to apply a torque to the second torsion bar.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to door lid assemblies with hinge assemblies for assisting in opening and raising door lids of vehicles. The hinge assemblies each include a force adjustment mechanism that allows an installer to apply a force to a torsion rod of the hinge assemblies after the hinge assemblies are installed in luggage compartments of the vehicles.

Figure 1:
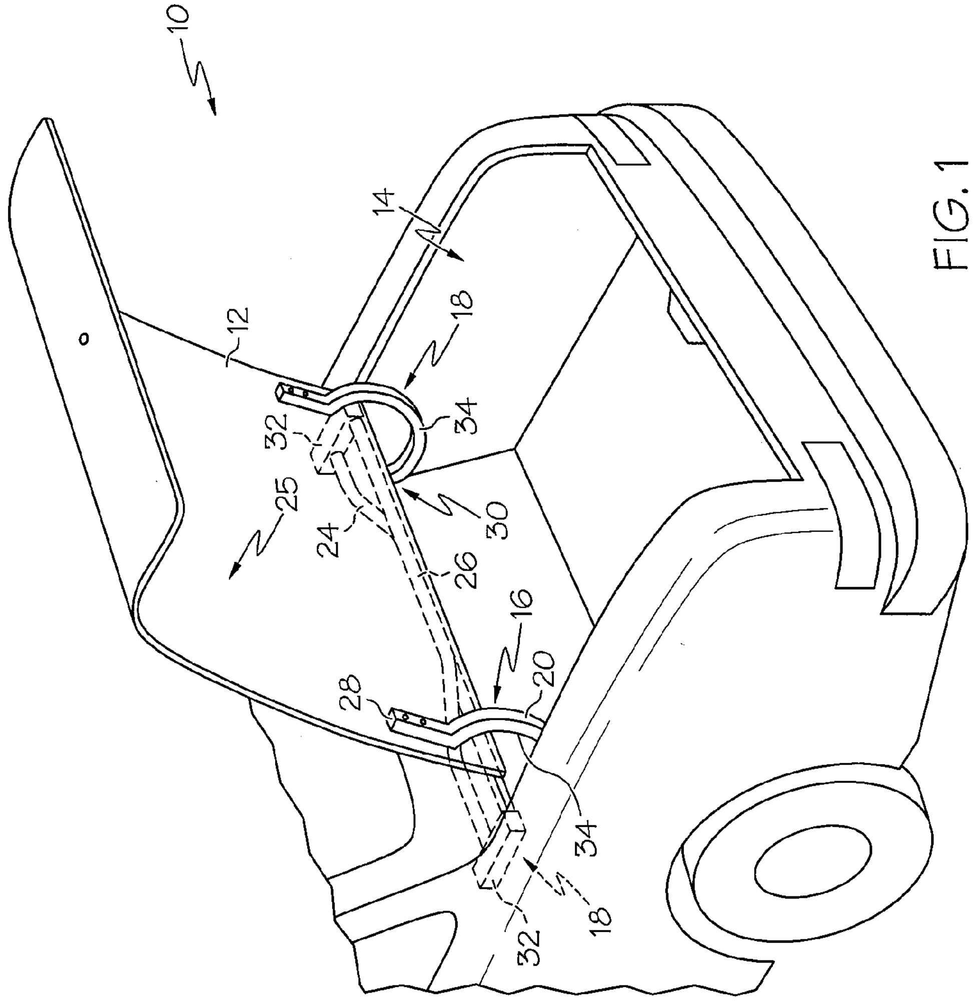
FIG. 1 illustrates a vehicle including a door lid and hinge subassembly according to one or more embodiments shown and described herein.

Referring to FIG. 1, a vehicle 10 includes a door lid 12 having an open configuration as shown for allowing access to a luggage compartment 14 and a closed configuration for inhibiting access to the luggage compartment 14. The door lid 12 is moveably supported by hinge assemblies 16 and 18 at opposite sides of the door lid 12. Each hinge assembly 16 and 18 includes a hinge arm 20 attached to an underside 25 of the door lid 12. The hinge arms 20 each generally include an elongate distal portion 28 that connects to the door lid 12 and a proximal portion 30 that connects to hinge arm support brackets 32 such that the hinge arms 20 pivot relative to the hinge arm support brackets 32. A rounded goose neck portion 34 extends between the proximal portion 30 and the distal portion 28. The hinge arms 20 are used to apply an opening force to the door lid 12 to facilitate opening of the door lid 12 and to keep the door lid 12 in its illustrated open position using a pair of torsion bars 24 and 26.

Figure 2:
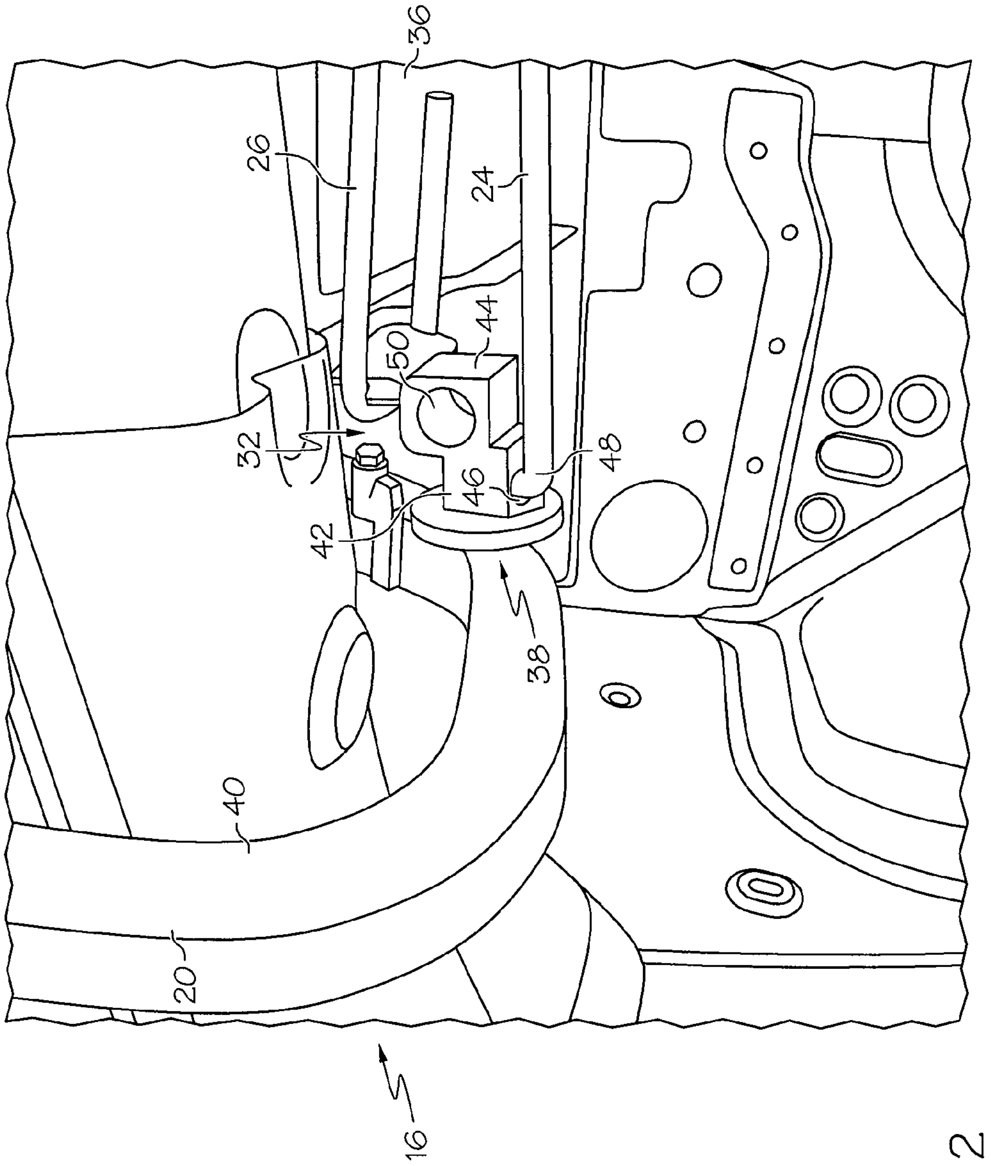
FIG. 2 is a side view of a hinge assembly for the vehicle of FIG. 1 according to one or more embodiments shown and described herein.
Figure 3:
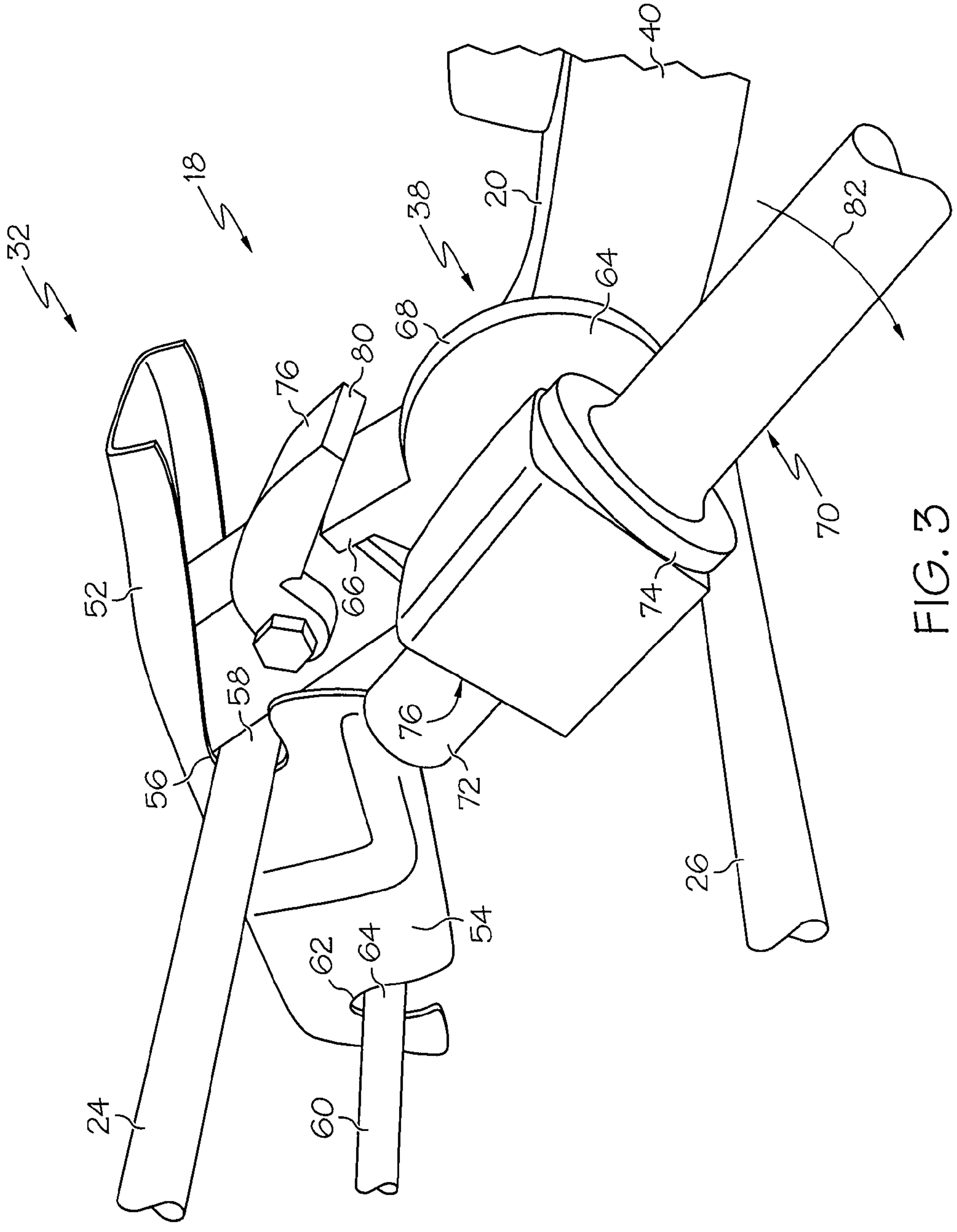
FIG. 3 is a side view of another hinge assembly for the vehicle of FIG. 1 according to one or more embodiments shown and described herein.
Figure 4:
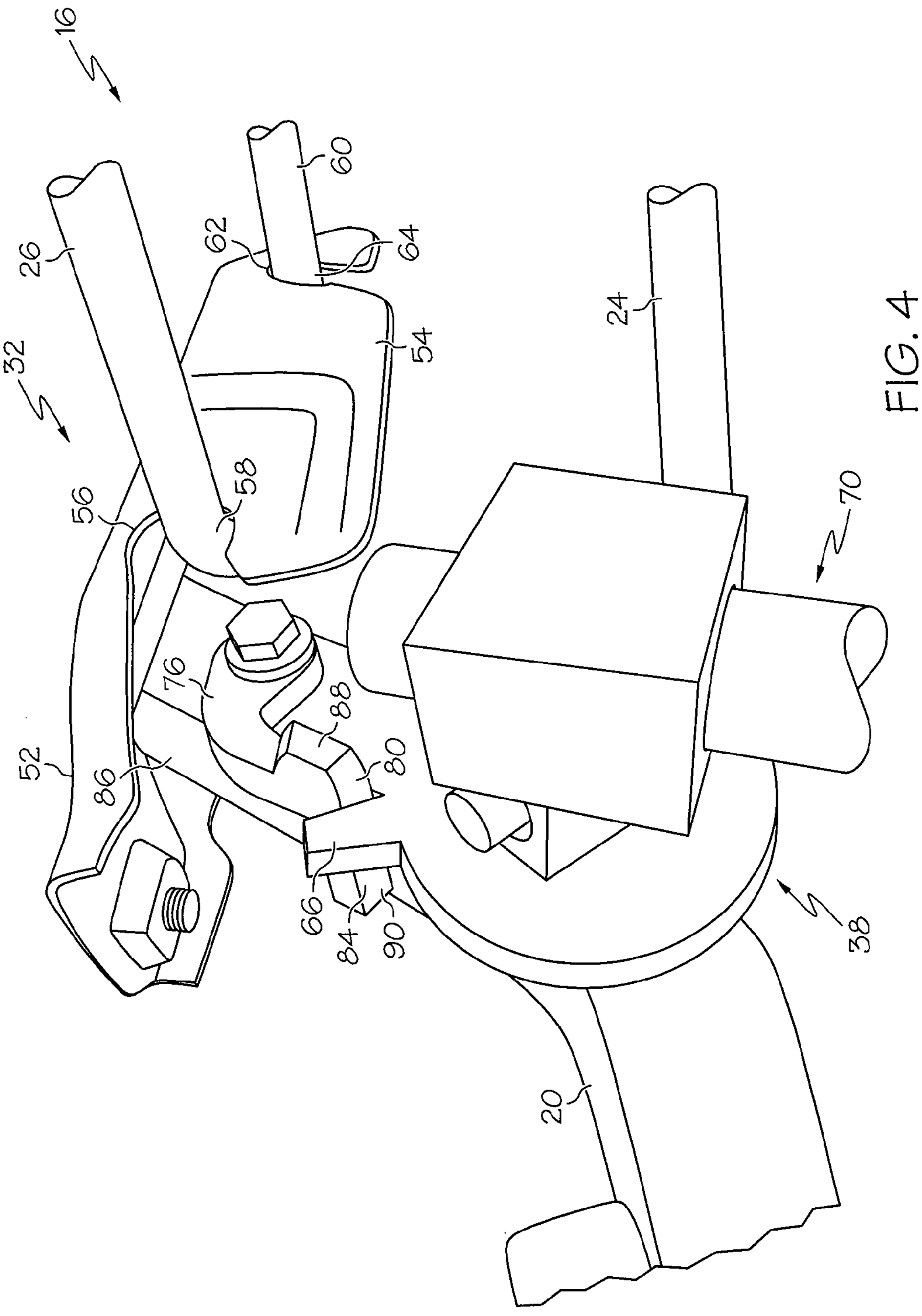
FIG. 4 is another side view of the hinge assembly of FIG. 2 according to one or more embodiments shown and described herein.

One of the hinge assemblies 16 and 18 is shown in FIGS. 2-4. Both hinge assemblies 16 and 18 are generally similar and include the same or similar components. Thus, both hinge assemblies 16 and 18 are used in FIGS. 2-4 to describe operation of the hinge assemblies 16 and 18.

Referring to FIG. 2, the hinge assembly 16 includes the hinge arm 20 that is pivotally connected to the hinge arm support bracket 32, which is fixedly mounted beneath a backshelf 36 of the luggage compartment 14. A force adjustment member 38 is pivotally connected to a widthwise facing side 40 of the hinge arm 20. The force adjustment member 38 includes a torsion bar mount portion 42 that extends outwardly from the widthwise facing side 40 and a tool receiving portion 44 rigidly connected to the torsion bar mount portion 42. A torsion bar receiving opening 46 extends through the torsion bar mount portion 42 at a location between the widthwise facing side 40 and the tool receiving portion 44. The torsion bar receiving opening 46 is sized to receive a shaped end 48 (e.g., L-shaped, U-shaped, etc.) of the torsion bar 24. The tool mount portion 44 (e.g., in the shape of a square tube) includes a tool receiving opening 50 that is sized to receive a torque applying tool (not shown). The tool receiving opening 50 is offset in the vehicle widthwise direction from the torsion bar receiving opening 46. In the illustrated embodiment, one or both of the tool receiving opening 50 and the torsion bar receiving opening 46 face toward the rear of the vehicle 10. This rearward facing arrangement of the openings 50 and 46 can facilitate installation of the hinge assemblies 16 and 18, which will be described in greater detail below.

Referring to FIGS. 3 and 4, the hinge arm support bracket 32 is fixedly mounted beneath the backshelf 36 of the luggage compartment 14. The hinge arm support bracket 32 includes a vehicle mounting portion 52 that has a length extending in the lengthwise direction of the vehicle 10 and a torsion bar mounting portion 54 that extends downwardly from the vehicle mounting portion 52. The torsion bar mounting portion 54 has a rearward opening notch 56 that receives a first bend 58 of a U-shaped end 60 of the torsion bar 24 or 26 and a downward opening notch 62 that receives a second bend 64 of the U-shaped end 60 of the torsion bar 24 or 26. The torsion bar mounting portion 54 fixes the U-shaped end 60 during a torque adjusting operation at the other hinge assembly 16 or 18 as will be described in greater detail below.

FIGS. 2 and 3 illustrate the force adjustment members 38 in an initial, untorqued configuration where minimal or no torque is being applied to the respective torsion bars 24 and 26. Referring particularly to FIG. 3, the force adjustment members 38 include a base plate that 64 that faces the widthwise facing side 40 and a locking finger 66 that extends outwardly from a periphery 68 of the base plate 64 in the lengthwise direction of the vehicle 10. A torque adjustment tool 70 has an insertion portion 72 that is sized to be received within the tool receiving opening 46 of the force adjustment member 38. The torque adjustment tool 70 may include a stop 74 having a dimension that is greater than a dimension of the tool receiving opening 46 to inhibit further penetration of the insertion portion 72 into the tool receiving opening 46.

An engagement member 76 or latch is pivotally connected to the widthwise facing side 40 of the hinge arm 20 at a location forward the force adjustment member 38. The engagement member 76 is connected to the hinge arm 20 at a forward location and extends rearward to a free end 80 that overhangs or overlaps the locking finger 66.

As can be seen by FIG. 3, as the torque adjustment tool 70 is rotated in the direction of arrow 82, the locking finger 66 rotates and comes into engagement with the free end 80 of the engagement member 76. Rotation of the force adjustment member 38 applies a torque to the torsion bar 26.

Referring now to FIG. 4, further rotation of the force adjustment member 38 pivots the locking finger 66 and the engagement member 76 until the locking finger 66 slides past the free end 80 of the engagement member 76. Once the locking finger 66 clears the free end 80 of the engagement member 76, the engagement member 76 pivots back to its initial position under the force of gravity, resting on the hinge arm 20. In some embodiments, the engagement member 76 may be biased (e.g., using a spring) toward its initial position. As can be seen by FIG. 4, the engagement member 76 has an overhang portion 84 that engages a top facing surface 86 of the hinge arm and an engaging portion 88 that extends outwardly away from the hinge arm 20 in the widthwise direction of the vehicle 10 to engage the locking finger 66. Rotation of the force adjustment member 38 due to the force applied by the torsion bar 26 causes the locking finger 66 to engage a surface 90 of the engagement member 76 thereby locking the force adjustment member 38 in place with a torque applied to the torsion bar 26. The torque from the torsion bar 26 is then transferred to the hinge arm 26 through the force adjustment member 38 such that the door lid 12 is biased toward the open position as shown by FIG. 1. Both hinge assemblies 16 and 18 may be adjusted in the same fashion.

Figure 5:
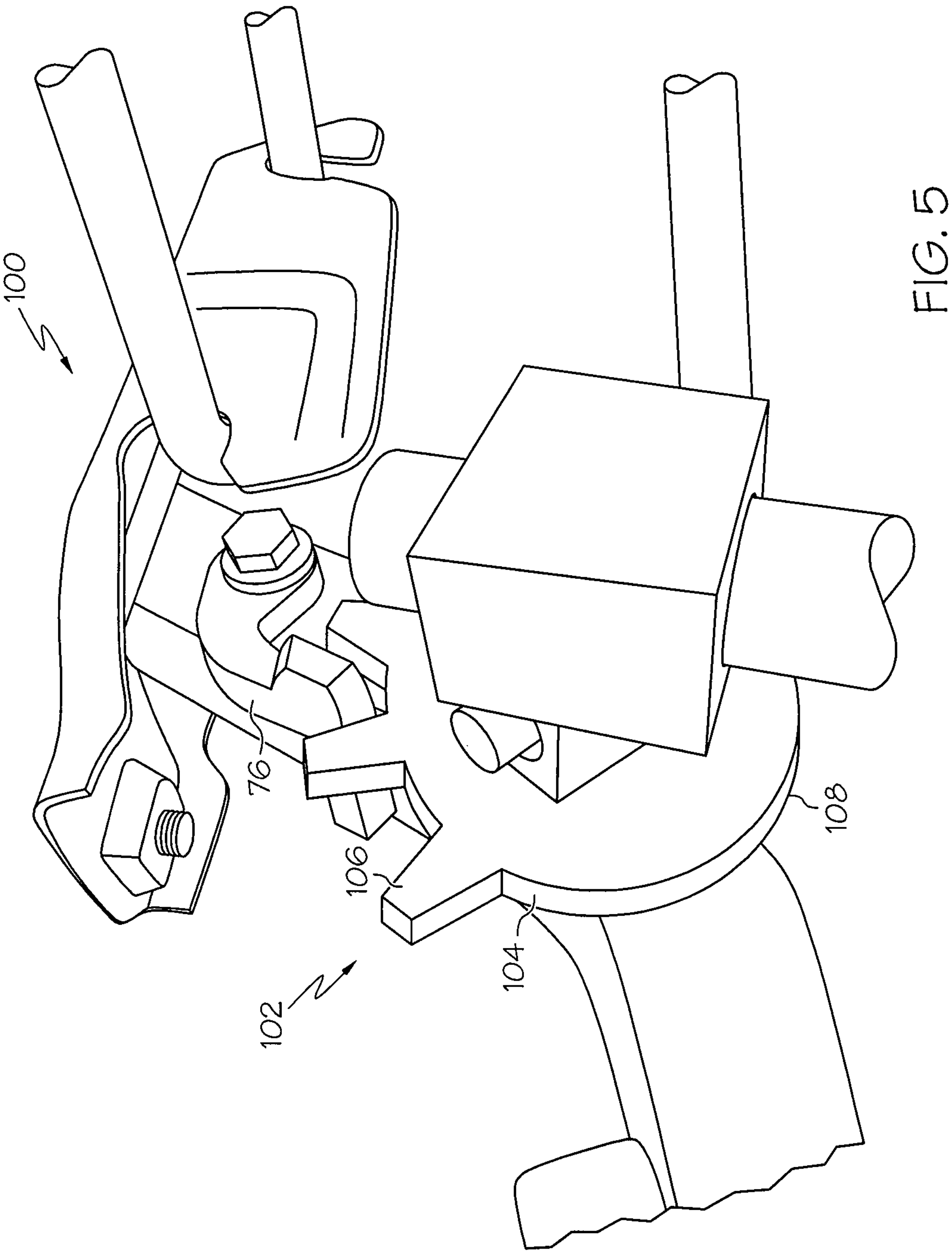
FIG. 5 is a side view of another hinge assembly according to one or more embodiments shown and described herein.

The hinge assemblies 16 and 18 may be referred to as a single-point torque adjustment mechanism. However, other adjustment arrangements are possible. For example, referring to FIG. 5, a multiple point torque adjusting hinge assembly 100 is illustrated. A ratchet system 102 that includes a force adjustment member 104 in the form of a ratchet having multiple locking fingers 106 extending about a periphery 108 of the force adjustment member 104 engages an engagement member 76 in the form of a pawl in a fashion similar to that described above. This multiple point adjustment arrangement can allow the installer or vehicle owner to fine tune the opening force that is applied to the door lid 12.

The above-described hinge assemblies allow for torque adjustment of the torsion rods after the hinge assemblies have been attached to the vehicle. This can provide improvement in the amount of force needed and applied by the installer to the torsion rods by hand, improvement in the posture of the installer when installing the hinge assemblies and improvement in the location of the installer as the is no need to reach into the luggage compartment to apply torque to the torsion rods. As one example, the hinge assemblies and the torsion rods may first be assembled to the door lid in their initial, untorqued configurations and then the door lid and hinge subassembly may then be attached to the vehicle. Once the door lid and hinge subassembly is attached to the vehicle, the torque may be applied to the torsion rods in the fashion described above.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hinge assembly for a door lid of a vehicle, the hinge assembly comprising:

a hinge arm support bracket that mounts within a luggage compartment of the vehicle;

a hinge arm connected to the support bracket at a proximal portion and including a distal portion that is mountable to the door lid, the hinge arm being pivotable relative to the support bracket;

a force adjustment member pivotally connected to the hinge arm, the force adjustment member comprising a torsion bar mount portion extending outwardly from the hinge arm having an opening therethrough to receive an end of a torsion bar and a tool receiving portion that engages a torque adjustment tool to pivot the force adjustment member to apply a torque to the torsion bar;

a locking finger extending outwardly from the force adjustment member; and an engagement member pivotally connected to the hinge arm;

wherein the force adjustment member having an initial configuration where the locking finger is disengaged from the engagement member and an adjusted configuration where the locking finger is engaged with the engagement member to apply a force to the torsion bar.

2. The hinge assembly of claim 1 further comprising a torsion bar having an end received within the opening, the torsion bar applying a torque to the hinge arm through the force adjustment member with the force adjustment member in the adjusted configuration.

3. The hinge assembly of claim 2, wherein the torsion bar is a first torsion bar, the hinge assembly further comprising a second torsion bar having an end that is mounted to the hinge arm support bracket.

4. The hinge assembly of claim 1, wherein the force adjustment member is pivoted from the initial configuration to the adjusted configuration, the locking finger engaging and pivoting the engagement member as the force adjustment member is pivoted from the initial configuration to the adjusted configuration.

5. The hinge assembly of claim 1, wherein the force adjustment member is in the form of a ratchet including multiple locking fingers.

6. A door lid and hinge subassembly for a vehicle, the door lid and hinge subassembly comprising:

a door lid that pivotally connects at a luggage compartment of a vehicle;

a hinge assembly comprising a hinge arm that is mounted to the door lid and a hinge arm support bracket that mounts within a luggage compartment of the vehicle, the hinge arm being pivotable relative to the support bracket;

a force adjustment member pivotally connected to the hinge arm, the force adjustment member comprising a torsion bar mount portion extending outwardly from the hinge arm having an opening therethrough to receive an end of a torsion bar and a tool receiving portion that engages a torque adjustment tool to pivot the force adjustment member to apply a torque to the torsion bar;

a torsion bar having an end received within the opening, the torsion bar applying a torque to the hinge arm through the force adjustment member with the force adjustment member in an adjusted configuration;

a locking finger extending outwardly from the force adjustment member; and an engagement member pivotally connected to the hinge arm;

wherein the force adjustment member having an initial configuration where the locking finger is disengaged from the engagement member and the adjusted configuration where the locking finger is engaged with the engagement member to apply a force to the torsion bar.

7. The door lid and hinge subassembly of claim 6, wherein the torsion bar is a first torsion bar, the hinge assembly further comprising a second torsion bar having an end that is mounted to the hinge arm support bracket.

8. The door lid and hinge subassembly of claim 6, wherein the force adjustment member is pivoted from the initial configuration to the adjusted configuration, the locking finger engaging and pivoting the engagement member as the force adjustment member is pivoted from the initial configuration to the adjusted configuration.

9. The door lid and hinge subassembly of claim 6, wherein the force adjustment member is in the form of a ratchet including multiple locking fingers.

10. A method of applying a torque to a torsion bar of a hinge assembly, the method comprising:

connecting a hinge arm to a door lid to be mounted to a vehicle, the hinge arm being pivotally connected to a support bracket that is mountable within a luggage compartment of a vehicle;

connecting a first torsion bar to the support bracket;

connecting a second torsion bar to a force adjustment member that is pivotally connected to the hinge arm, the force adjustment member comprising a torsion bar mount portion extending outwardly from the hinge arm having an opening therethrough to receive an end of the second torsion bar and a tool receiving portion that engages a torque adjustment tool to pivot the force adjustment member to apply a torque to the second torsion bar; and rotating a locking finger extending outwardly from the force adjustment member past an engagement member pivotally connected to the hinge arm, wherein the force adjustment member having an initial configuration where the locking finger is disengaged from the engagement member and an adjusted configuration where the locking finger is engaged with the engagement member to apply a force to the second torsion bar.

11. The method of claim 10 further comprising:

mounting the door lid to the vehicle; and mounting the support bracket within the luggage compartment.

12. The method of claim 11 further comprising after mounting the support bracket within the luggage compartment, using a torque adjustment tool to engage the force adjustment member.

13. The method of claim 12, wherein the torque adjustment tool is received within a tool receiving opening extending through the tool receiving portion of the force adjustment member.

14. The method of claim 12 further comprising rotating the torque adjustment tool to rotate the force adjustment member thereby applying a torque to the second torsion bar.

15. The method of claim 10, wherein the force adjustment member is pivoted from the initial configuration to the adjusted configuration, the locking finger engaging and pivoting the engagement member as the force adjustment member is pivoted from the initial configuration to the adjusted configuration.

16. The method of claim 10, wherein the force adjustment member is in the form of a ratchet including multiple locking fingers.

* * * * *